(12) United States Patent
Sprinkle et al.

(10) Patent No.: US 8,322,482 B2
(45) Date of Patent: Dec. 4, 2012

(54) TRACTOR GROUND POSITIONING SYSTEM

(75) Inventors: David L. Sprinkle, Warrenton, GA (US); William O. Ifode, Grovetown, GA (US); Mark D. Evans, Grovetown, GA (US)

(73) Assignee: Deere & Company, Moline, IL (US)

( * ) Notice: Subject to any disclaimer, the term of this patent is extended or adjusted under 35 U.S.C. 154(b) by 94 days.

(21) Appl. No.: 12/891,128

(22) Filed: Sep. 27, 2010

(65) Prior Publication Data
US 2012/0073894 A1 Mar. 29, 2012

(51) Int. Cl.
*B60K 23/00* (2006.01)
(52) U.S. Cl. .......... 180/321; 180/53.2; 180/336; 701/50
(58) Field of Classification Search ................ 180/53.2, 180/53.3, 320, 321, 336; 701/50
See application file for complete search history.

(56) References Cited

U.S. PATENT DOCUMENTS

| | | | |
|---|---|---|---|
| 4,132,132 A * | 1/1979 | Shaffer | 74/733.1 |
| 4,817,499 A | 4/1989 | Bellanger et al. | |
| 5,190,118 A * | 3/1993 | Yelton | 180/53.2 |
| 5,231,892 A | 8/1993 | Haight | |
| 5,320,186 A * | 6/1994 | Strosser et al. | 172/8 |
| 5,592,029 A * | 1/1997 | Hollstein et al. | 307/9.1 |
| 6,015,019 A * | 1/2000 | Grimes et al. | 180/53.2 |
| 6,467,564 B1 | 10/2002 | Fava et al. | |
| 6,655,233 B2 | 12/2003 | Evans et al. | |
| 6,711,839 B1 | 3/2004 | Kawamura et al. | |
| 6,851,495 B2 * | 2/2005 | Sprinkle et al. | 180/53.2 |
| 7,721,840 B2 * | 5/2010 | McCord et al. | 180/336 |
| 7,823,897 B2 * | 11/2010 | Kelly et al. | 280/233 |
| 7,954,592 B2 * | 6/2011 | Miyazaki et al. | 180/321 |
| 2008/0277190 A1 * | 11/2008 | McCord et al. | 180/444 |

* cited by examiner

*Primary Examiner* — Paul N Dickson
*Assistant Examiner* — Timothy Wilhelm

(57) ABSTRACT

A tractor ground positioning system includes ground positioning controls outside of an operator station of the tractor that can be actuated by an operator while maintaining contact with the tractor to move the tractor forward or reverse to connect an implement. A controller commands the tractor to move at a desired ground speed only while the operator continues actuating the controls.

18 Claims, 3 Drawing Sheets

TRACTOR GROUND POSITIONING SYSTEM

FIELD OF THE INVENTION

This invention relates generally to ground positioning system for a tractor or other work vehicle for use in connecting the tractor or vehicle with an implement or trailing attachment.

BACKGROUND OF THE INVENTION

Three point hitches designed in accordance with ISO 730 have been used for many years and are universally accepted for attaching implements or trailing attachments to tractors or other work vehicles. The ISO 730 hitch requires precise alignment of the tractor to the implement so that the implement may be attached easily, usually by backing up the tractor. However, it may be difficult to precisely align the tractor to the implement. As a result, attaching the implement often requires two persons.

Three point hitches may be raised and lowered using switches remote from the operator station of the tractor. For example, electrical or electro-hydraulic controls for a three point hitch may be located adjacent the rear of the tractor, typically on the tractor's right or left rear fenders. These control devices make it more convenient for the operator to hook up rear mounted implements while off the tractor.

For example, a pair of switches may be located adjacent the rear of the tractor, one switch to supply a signal to a valve or valves to raise the hitch, and the other switch to supply a signal to lower the hitch. Even with the controls mounted on the fender, however, changing rear mounted implements on a three point hitch can be labor intensive because of the difficulty and time required to accurately position the tractor with respect to the implement.

Quick attaching couplers also have been developed to allow faster attachment of three point hitches to rear mounted implements from the operator station of the tractor. A quick attaching coupler may be an inverted U-shape arch that is attached to the conventional three points of a tractor hitch. The frame of a quick attaching coupler may have an upper hook with a long, tapered point and two lower coupling hooks or jaws with a latching and unlatching arrangement to hold the implement hitch pins. To hook up a quick attaching coupler to an implement, the hitch may be lowered and the tractor backed into place near the implement. Then the hitch may be raised with the hydraulic system so that the upper hook engages the upper pin on the implement. Further lifting causes the weight of the implement to force the lower hitch pins to enter the lower hooks.

Quick attach and auto hitch systems have not eliminated the inherent difficulty in attaching some implements. For example, an operator may need to back up the tractor several times to get in exactly the right position for the implement. After each attempt, the operator may need to dismount from the tractor operator station and try completing the attachment process. Additionally, quick attaching couplers may not be useful or suitable for many older attachments, nonstandard attachments, and attachments that do not sit level on the ground surface when detached. It may be difficult for an operator to complete attachment of some implements because it may require repositioning the tractor.

For these reasons, there is a need for greater operator safety and ease of use when hooking up a tractor to implements and other trailing attachments. A system is needed to make changing rear mounted implements easier for the operator. A system is needed to reduce the repeated back up positioning of the tractor to the implement, and to help accurately position the tractor. A system is needed that lets an operator complete the attachment process without repeatedly dismounting from the tractor.

SUMMARY OF THE INVENTION

A tractor ground positioning system includes controls on the outer surface of the tractor outside the operator station, to move the tractor slowly in forward or reverse for short distances. The controls may be within reach of an operator who is on the ground while connecting an implement to the tractor, preferably on a fender or other outer surface. While on the ground, the operator may actuate one or more ground positioning controls to move the tractor into position for a short distance. The operator must continuously actuate the ground positioning controls while remaining in direct contact with the controls on the tractor. If the operator discontinues contact with the controls on the tractor, the ground positioning system will cause the tractor to stop moving.

The ground positioning system provides greater operator safety and ease of use when hooking up a tractor to rear mounted implements. The tractor ground positioning system makes changing rear mounted implements easier for the operator. The system reduces the repeated back up positioning of the tractor to the implement, and helps accurately position the tractor. The system lets an operator complete the attachment process without repeatedly dismounting from the tractor.

DESCRIPTION OF THE PREFERRED EMBODIMENT

Figure 1:
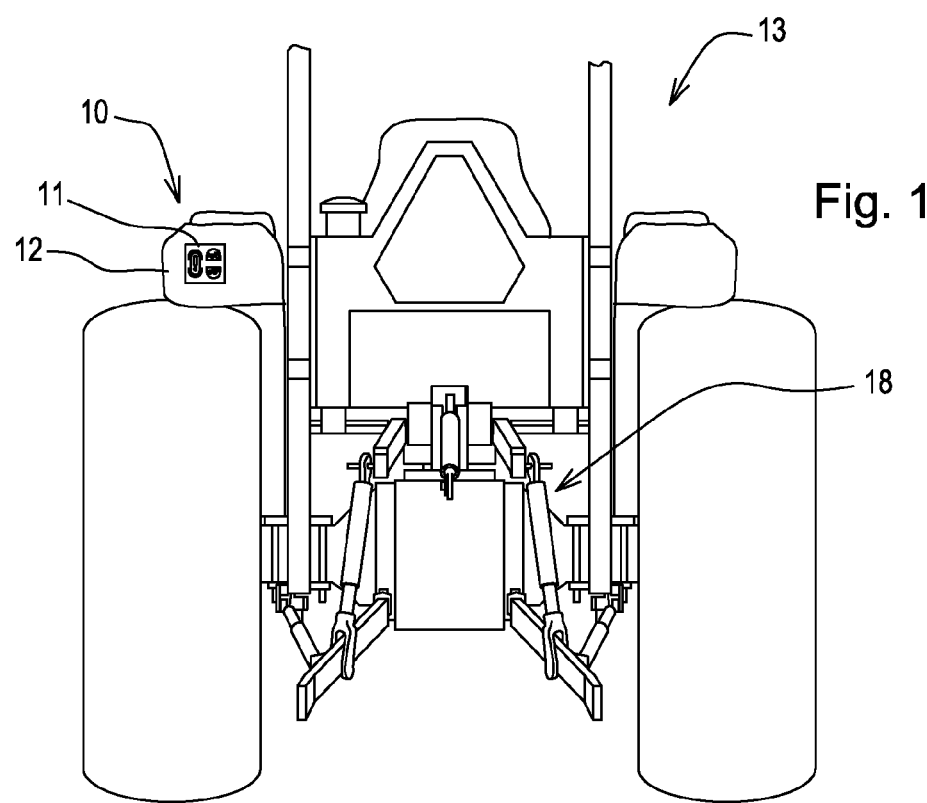
FIG. 1 is a rear view of a tractor with a ground positioning system according to one embodiment of the invention.
Figure 2:
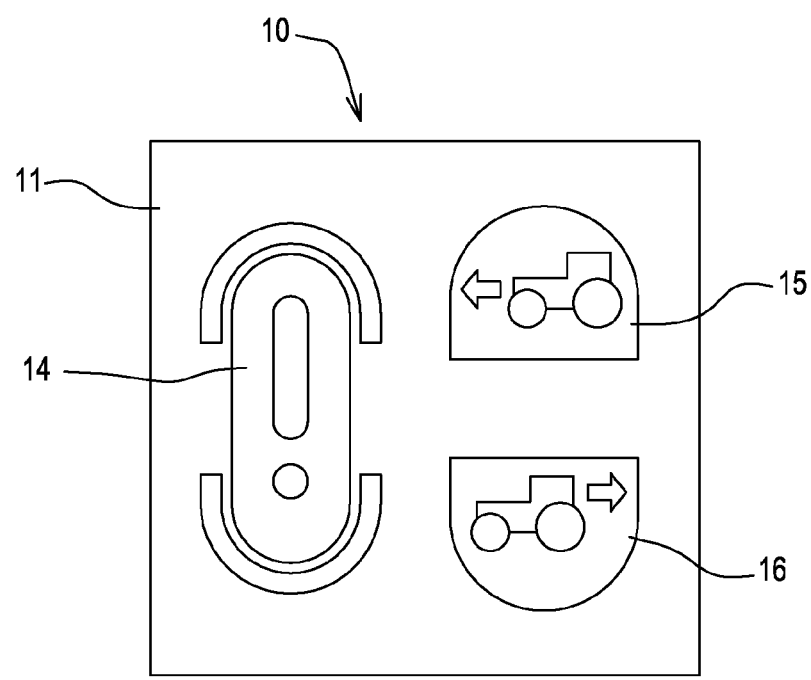
FIG. 2 is a rear view of controls for a tractor ground positioning system according to one embodiment of the invention.

In one embodiment shown in FIGS. 1 and 2, tractor ground positioning system 10 may include ground positioning controls 11 with forward switch 15 and reverse switch 16 located on the outer surface of the tractor outside the operator station. For example, the ground positioning controls may be located at the rear of the tractor, preferably on a fender or other outer surface within reach of an operator who is standing on the ground while he or she also can reach the tractor's three point hitch 18. While on the ground, the operator may actuate the ground positioning controls to move the tractor slowly over short distances into position for connecting an implement to the tractor.

The ground positioning controls are mounted on a location on the tractor where implement attachment is done. The controls allow the operator to move the vehicle while he or she is in close proximity to the task being performed.

In one embodiment, to move the tractor using the ground positioning system, the operator must continuously actuate the ground positioning controls which require the operator to remain in direct contact with the controls on the tractor. The operator may actuate these controls while standing near the rear of the tractor, after exiting the operator station. If the operator discontinues contact with the controls on the tractor, the ground positioning system will cause the tractor to stop moving.

In one embodiment, ground positioning controls 11 may be any switch, button or other momentary contact that an operator must continuously press to remain actuated. Only one of the forward switch and reverse switch may be actuated at a given time. For example, the forward and reverse switches may be configured as a toggle switch with a spring to return to a neutral position, when neither switch is actuated.

In one embodiment, an operator may actuate either of switches 15, 16 on the tractor to move the tractor slowly forward or backward into a position where he or she can connect an implement to the three point hitch of the tractor. The ground positioning system is supplemental to the operator station controls, and may be used for moving the tractor for short distances, typically less than about 0.5 meters. Although the ground positioning controls in a preferred embodiment are located at the rear of the tractor, the controls also may be mounted at the front of the tractor for the purpose of moving the tractor a short distance in position to connect an implement to a front three point hitch.

In one embodiment, the ground speed of the tractor when operating the ground positioning system may be fixed at a desired speed of below about 25 mm per second and preferably about 10 mm per second. For example, the ground positioning system may specify and set the ground speed of the tractor below any speed normally attainable by the operator using the pedals in the operator station. Alternatively, the ground speed with the ground positioning system may be variable from zero up to a preset maximum safe speed for ground positioning while the operator is off the tractor. The maximum allowable speed may be independent of engine speed, or of range transmission gear selection.

In one embodiment, the ground speed of the tractor may be sensed by one or more Hall effect sensors which provide feedback signals to controller 20 so that the selected speed is maintained regardless of the range transmission gear selection or engine speed. For example, the desired ground speed may be variable between a minimum speed of zero and a maximum of not more than about 25 mm per second.

In one embodiment, forward and reverse switches 15, 16 may be moved by the operator to actuate a potentiometer that is signal connected to controller 20. The controller may be programmed to send a proportional speed signal, in response to, and proportional to, a signal from the potentiometer, to the respective solenoid 31, 34, depending on which switch is actuated. The proportional speed signal may range from a zero speed signal up to the pre-programmed maximum speed signal corresponding to the maximum travel or position of the forward and reverse switches.

Alternatively, in one embodiment of the invention, ground positioning controls 11 also may include engagement switch 14 which the operator must engage at the same time as the forward or reverse switch while he or she is out of the operator station. The proportional speed signal may range from a zero speed signal up to the pre-programmed maximum speed signal corresponding to the maximum travel or position of the engagement switch.

In one embodiment, the ground positioning system may include one or more speed sensors. For example, first rotation speed sensor 44, such as a Hall effect sensor, may be arranged adjacent a rotating part of range transmission, such as gear 46 that rotates in direct proportion to the vehicle ground speed. Controller 20 may receive a frequency signal from sensor 44 indicating the actual speed, and compare it to the desired speed. If the actual speed is not the same as the desired speed, the controller then may adjust the output speed signal to the proportional pressure reducing valve solenoids 30, 34 using a PID control algorithm to reach the desired speed. Alternatively, other control algorithms may be used to reach or approach the desired speed.

Optionally, second rotation speed sensor 48 may be arranged adjacent another rotating part of the range transmission, such as gear 49 that also may rotate in direct proportion to the vehicle ground speed. The second rotation speed sensor may be used to verify that the actual ground speed is not different from the desired speed. For example, if the second rotation speed sensor indicates a difference, the controller may provide a command to engine controller or ignition module 55 to discontinue operation of the tractor ground positioning system or stop the engine.

Alternatively, ground speed detection and feedback may be accomplished by a hydrostatic pump displacement control system. This control system may control the angle of the swash plate of the hydrostatic pump using an angle sensor, which may be indicative of the tractor ground speed.

Additionally, in one embodiment, tractor ground positioning system 10 may be enabled by enable switch 17 located in the operator station of the tractor. Controller 20 may include logic requiring the operator to actuate the enable switch in the operator station before actuating any of the ground positioning controls at the rear of the tractor. Additionally, while the operator is actuating the ground positioning controls at the rear of the tractor, the system may disable the controls in the operator station including the forward and reverse pedals. After the operator discontinues actuating the ground positioning controls, the controls in the operator station then may be used. The operator station controls may disable the ground positioning controls.

Figure 3:
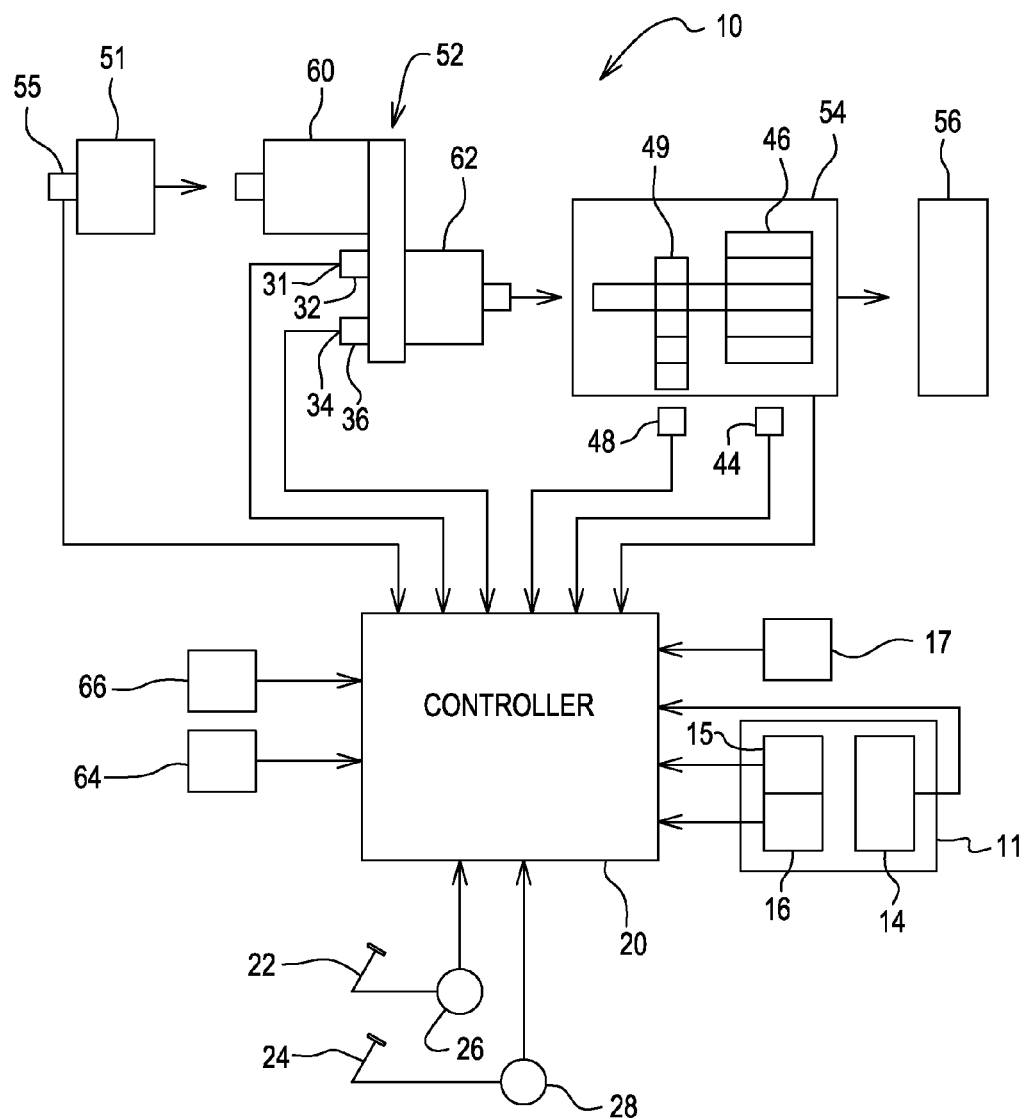
FIG. 3 is a block diagram of a tractor ground positioning system according to one embodiment of the invention.

In one embodiment shown in FIG. 3, tractor ground positioning system 10 may be used with a tractor having an engine 51 which rotationally drives hydrostatic transmission 52. The hydrostatic transmission may include variable displacement hydrostatic pump 60 and hydraulic motor 62. The hydrostatic transmission may drive a multi-speed gear transmission 54, for transmitting power to one or more drive wheels 56. The tractor speed may be controlled by adjustment of the speed output of the hydrostatic transmission.

In one embodiment, for normal operation of the tractor from the operator station, the operator may use forward pedal 22 and reverse pedal 24. The forward pedal may be operatively engaged with potentiometer 26 to produce a forward pedal position signal, and the reverse pedal may be operatively engaged with potentiometer 28 to produce a reverse pedal position signal. The potentiometers may be signal-connected to electronic controller 20.

In one embodiment, electronic controller 20, such as a microprocessor-based microcontroller, may be signal-connected, through signal conditioning or amplifying circuitry, to solenoid 31 of forward drive proportional pressure control valve 32 and to solenoid 34 of reverse drive proportional pressure control valve 36. The output current to energize the forward or reverse pressure control valves may be substantially proportional to the corresponding position signals from the forward and reverse pedals respectively.

In one embodiment, before operating the tractor ground positioning system, the controller must determine that at least one or more system checks are satisfied. For example, the system checks may be in the form of switches or electronic signals that controller 20 may receive from other devices on the tractor. For example, the system checks may require seat switch 64 to detect the absence of a seated operator at the operator station of the tractor. In other words, the ground positioning system may not be actuated to move the tractor if an operator is seated at the operator station. The system checks also may include park brake switch 66 to detect the park brake is engaged. The park brake also may remain engaged while the ground positioning system causes the tractor to move slowly in forward or reverse. Additionally, the system checks may require forward pedal 22 and reverse pedal 24 to be at home, and not be actuated. The system checks may require the speed of engine 51 to be under a specified value such as 1200 rpm. The system checks may require transmission 54 to be in a specified low range such as the "A" range. The system checks may require one or more speed sensors 44, 48 to be working and operational, and may require the ground speed of the tractor to be zero. Thus, the controller may not permit the ground positioning controls to cause the transmission or other device to move the tractor in forward or reverse at the desired ground speed until and unless one or more system checks are and remain satisfied.

Alternatively, in one embodiment, ground positioning system 10 may be used with a tractor or vehicle having one or more electric wheel motors instead of a hydrostatic transmission. The operator may actuate the ground positioning controls at the rear of the tractor, causing the controller to provide speed commands to each electric wheel motor to rotate at the desired speed. In another alternative embodiment, the ground positioning system may be used with a directional reversing transmission that uses electronically controlled forward and reverse clutches, by modulating current to the traction clutches while the transmission is in the lowest gear.

Figure 4:
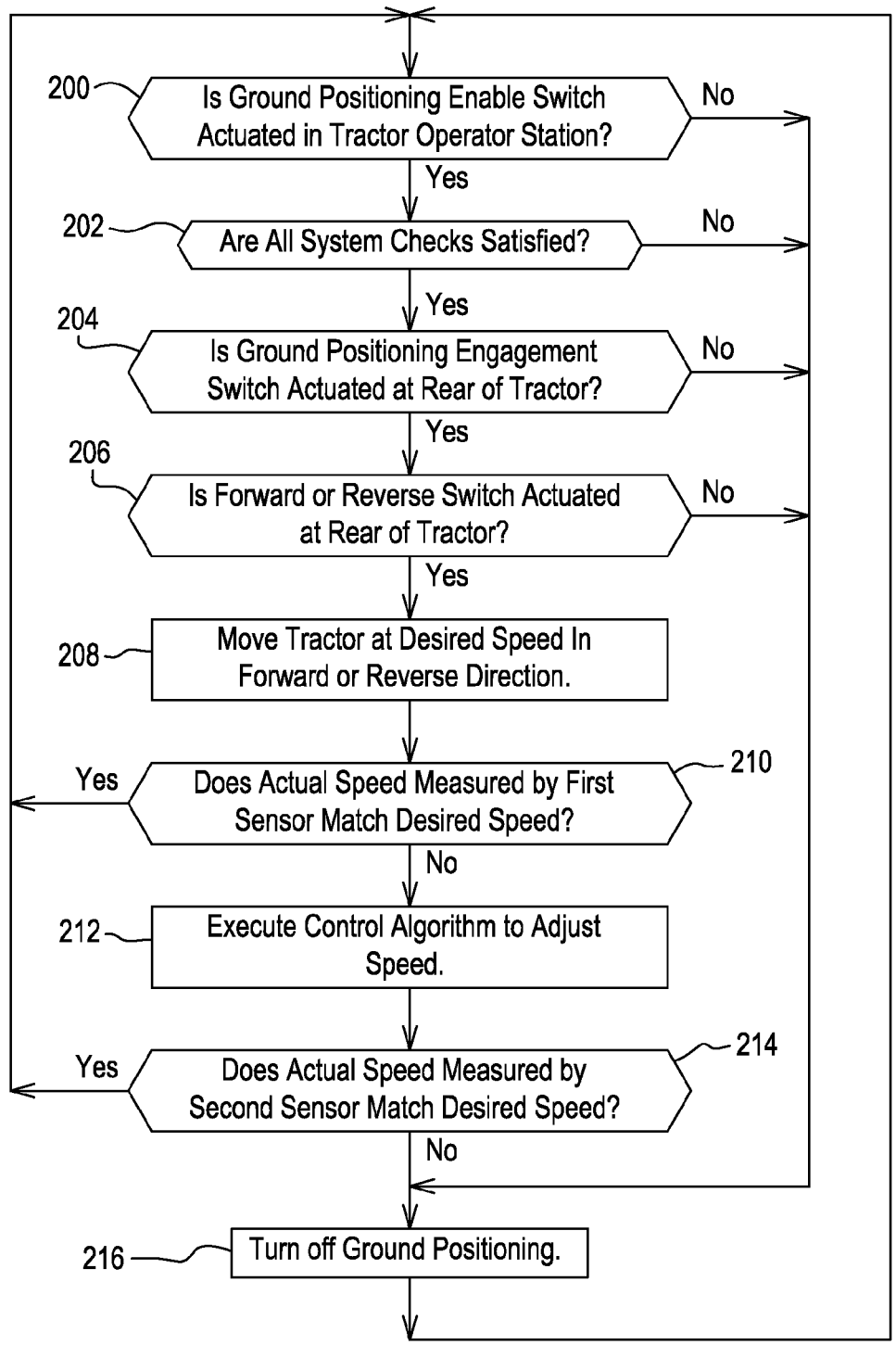
FIG. 4 is a logic diagram of a tractor ground positioning system according to one embodiment of the invention.

In one embodiment, the tractor ground positioning system may operate according to the logic diagram of FIG. 4. In block 200, the vehicle controller may determine if the ground positioning enable switch in the operator station of the tractor or other work vehicle is actuated. If the ground positioning enable switch is actuated, in block 202 the controller may determine if one or more system checks are satisfied. If the system checks are satisfied, in block 204 the controller may determine if the ground positioning engagement switch is actuated at the rear of the tractor. If the ground positioning engagement switch is actuated, in block 206 the controller may determine if either the forward or reverse switch at the rear of the tractor is actuated. If the forward or reverse switch is actuated, in block 208 the controller commands the transmission to move the tractor in forward or reverse at the desired speed. Optionally, the controller also may trigger an audible warning and/or a short delay time before commanding the tractor to move in forward or reverse.

In one embodiment, in block 210, the controller then may determine if the actual ground speed of the tractor detected by a first sensor matches the desired speed. If it does not match the desired speed, in block 212 the controller may adjust the speed. For example, a PID control algorithm, or other similar control algorithm, may be used to adjust the actual speed toward the desired speed. In block 214, the controller then may determine if the actual ground speed detected by a second sensor matches the desired speed. If it does not match the desired speed, the controller may turn off in ground positioning system in block 216. For example, the controller may command the transmission to move to a neutral position. Alternatively, the controller may kill the engine by various means such as shutting off fuel flow with a solenoid, or grounding the engine ignition.

In one embodiment, during operation of the tractor ground positioning system, the controller may monitor the status of the ground positioning enable switch in the operator's station, one or more system checks, the ground positioning engagement switch, and the forward and reverse switches at the rear of the tractor. If any of the switches is not actuated, or any of the system checks are not satisfied, the controller may turn off ground positioning as shown in block 216.

Having described the preferred embodiment, it will become apparent that various modifications can be made without departing from the scope of the invention as defined in the accompanying claims.

The invention claimed is:

1. A tractor ground positioning system comprising
   ground positioning controls on the tractor outside an operator station of the tractor and adjacent a three point hitch on the tractor; the ground positioning controls actuated only by direct and continuous contact;
   a seat switch in the operator station indicating if there is a seated operator; and
   a controller electrically connected to the ground positioning controls to command a transmission of the tractor to move the tractor at a desired ground speed in forward or reverse over short distances if the seat switch indicates the absence of a seated operator and while the controls remain continuously actuated.

2. The tractor ground positioning system of claim 1 wherein the ground positioning controls includes a forward switch and a reverse switch on the tractor.

3. The tractor ground positioning system of claim 2 wherein the ground positioning controls include an engagement switch adjacent the forward switch and reverse switch.

4. The tractor ground positioning system of claim 1 further comprising an enable switch in the operator station of the tractor that must be actuated before actuating the ground positioning controls.

5. The tractor ground positioning system of claim 1 further comprising at least one system check that must be satisfied before actuating the ground positioning controls.

6. The tractor ground positioning system of claim 1 further comprising a first speed sensor connected to the controller and sensing the actual ground speed of the tractor.

7. The tractor ground positioning system of claim 6 wherein the controller includes a control algorithm to adjust the ground speed of the tractor if the actual ground speed received from the first speed sensor does not match the desired slow ground speed.

8. A tractor ground positioning system comprising:
   ground positioning controls on the tractor outside an operator station of the tractor and adjacent a three point hitch on the tractor; the ground positioning controls actuated only by direct and continuous contact;
   a controller electrically connected to the ground positioning controls to command a transmission of the tractor to move the tractor at a desired ground speed in forward or reverse over short distances while the controls remain continuously actuated;
   a first speed sensor connected to the controller and sensing the actual ground speed of the tractor; and,
   a second speed sensor connected to the controller and sensing the actual ground speed of the tractor.

9. A tractor ground positioning system comprising:
   a forward ground positioning control and a reverse ground positioning control outside an operator station of the tractor that can be actuated only from the ground while in contact with the tractor adjacent a hitch on the tractor;
   a transmission having a plurality of different operator selectable ranges including a low range;
   a controller that commands the tractor to move at a desired ground speed only if a low range of the transmission is selected and while continuously actuating either of the ground positioning controls; and a speed sensor connected to the controller causing the controller to discontinue commanding the tractor to move at the desired ground speed if the actual ground speed sensed by the speed sensor does not match the desired ground speed.

10. The tractor ground positioning system of claim 9 further comprising an enable switch in the operator station that must be actuated before actuating either of the ground positioning controls outside the operator station.

11. The tractor ground positioning system of claim 9 further comprising an engagement switch adjacent the forward ground positioning control and the reverse ground positioning control that must be actuated while the forward ground positioning control or the reverse ground positioning control are actuated.

12. The tractor ground positioning system of claim 9 wherein the controller further comprising a control algorithm to adjust the ground speed of the tractor to match the desired ground speed.

13. A tractor ground positioning system comprising:
an enable switch, a foot pedal and a park brake in a tractor operator station;
a ground positioning control switch adjacent a three point hitch on the tractor that may be actuated only from outside the tractor operator station;
a controller connected to the enable switch, foot pedal, park brake and ground positioning control switch, that commands the tractor to move at a desired ground speed only if the enable switch, park brake and ground positioning control switch are actuated, and the foot pedal is not actuated.

14. The tractor ground positioning system of claim 13 further comprising a plurality of system checks that the controller must determine are satisfied before commanding the tractor to move at the desired ground speed.

15. A tractor ground positioning system comprising:
an enable switch in a tractor operator station;
a ground positioning control switch adjacent a three point hitch on the tractor that may be actuated only from outside the tractor operator station;
a controller connected to the enable switch and ground positioning control switch that commands the tractor to move at a desired ground speed only if the enable switch and ground positioning control switch are actuated;
a plurality of system checks that the controller must determine are satisfied before commanding the tractor to move at the desired ground speed;
wherein one of the system checks is a seat switch in the operator station to detect the absence of a seated operator.

16. The tractor ground positioning system of claim 15 further comprising a ground speed sensor connected to the controller to sense the actual ground speed of the tractor.

17. The tractor ground positioning system of claim 16 wherein the controller adjusts the command to move the tractor at the desired ground speed based on information from the ground speed sensor.

18. A tractor ground positioning system comprising:
an enable switch in a tractor operator station;
a ground positioning control switch adjacent a three point hitch on the tractor that may be actuated only from outside the tractor operator station;
a controller connected to the enable switch and ground positioning control switch that commands the tractor to move at a desired ground speed only if the enable switch and ground positioning control switch are actuated;
wherein a park brake must be engaged to move the tractor at the desired ground speed.

* * * * *